United States Patent
Nishio

(10) Patent No.: US 9,816,470 B2
(45) Date of Patent: Nov. 14, 2017

(54) FILTERING DEVICE

(71) Applicant: Aisan Kogyo Kabushiki Kaisha, Obu-shi, Aichi-ken (JP)

(72) Inventor: Toshio Nishio, Handa (JP)

(73) Assignee: AISAN KOGYO KABUSHIKI KAISHA, Obu-shi, Aichi-ken (JP)

( * ) Notice: Subject to any disclaimer, the term of this patent is extended or adjusted under 35 U.S.C. 154(b) by 0 days.

(21) Appl. No.: 14/987,817

(22) Filed: Jan. 5, 2016

(65) Prior Publication Data

US 2016/0115919 A1    Apr. 28, 2016

Related U.S. Application Data

(63) Continuation of application No. 12/955,293, filed on Nov. 29, 2010.

(30) Foreign Application Priority Data

Dec. 4, 2009  (JP) ................. 2009-276087

(51) Int. Cl.
| | |
|---|---|
| *F02M 37/22* | (2006.01) |
| *B01D 29/90* | (2006.01) |
| *B01D 29/13* | (2006.01) |
| *F02M 37/10* | (2006.01) |

(52) U.S. Cl.
CPC ............ *F02M 37/22* (2013.01); *B01D 29/13* (2013.01); *B01D 29/90* (2013.01); *F02M 37/10* (2013.01); *F02M 2037/225* (2013.01)

(58) Field of Classification Search
None
See application file for complete search history.

(56) References Cited

U.S. PATENT DOCUMENTS

| | | | | |
|---|---|---|---|---|
| 3,108,065 A | * | 10/1963 | McMichael | B01D 35/0273 210/172.3 |
| 3,826,372 A | * | 7/1974 | Bell | B01D 35/0273 210/172.4 |
| 3,875,059 A | * | 4/1975 | Maschino | B01D 29/114 210/172.3 |
| 4,304,664 A | | 12/1981 | McAlindon et al. | |

(Continued)

FOREIGN PATENT DOCUMENTS

| | | |
|---|---|---|
| DE | 10328591 A1 | 1/2004 |
| DE | 10 2005 018 469 | 11/2006 |

(Continued)

OTHER PUBLICATIONS

Examination Report dated May 8, 2012, from German Patent & Trademark Office for counterpart German patent application No. 10 2010 008 133.7 (with English translation).

(Continued)

*Primary Examiner* — Robert James Popovics
(74) *Attorney, Agent, or Firm* — Ladas & Parry LLP

(57) ABSTRACT

A filtering device may includes a bag-shaped filter member that is capable of being connected to a fuel inlet port of a fuel pump disposed in a fuel tank in order to filtrate fuel drawn by the fuel pump, and a wall member that is connected to the filter member such that a fuel reservoir portion can be defined above the filter member.

4 Claims, 19 Drawing Sheets

(56) References Cited

U.S. PATENT DOCUMENTS

| | | | | |
|---|---|---|---|---|
| 4,853,123 | A | * | 8/1989 | Hayes .................. B01D 29/111 156/294 |
| 4,966,522 | A | * | 10/1990 | Koyama .............. B01D 35/027 210/172.4 |
| 5,085,768 | A | * | 2/1992 | Murakami ............. B03C 1/286 123/198 C |
| 5,111,844 | A | * | 5/1992 | Emmert ............... F02M 37/106 123/514 |
| 5,395,520 | A | * | 3/1995 | Ito .......................... B01D 29/15 210/172.4 |
| 5,547,568 | A | * | 8/1996 | Sasaki ................... B01D 29/15 210/172.4 |
| 5,582,729 | A | * | 12/1996 | Shioda ............... B01D 35/0273 210/172.4 |
| 5,584,988 | A | | 12/1996 | Hashimoto et al. |
| 6,241,883 | B1 | * | 6/2001 | Noda ................... B01D 35/027 123/509 |
| 6,283,731 | B1 | * | 9/2001 | Yoshioka ........... B01D 35/0273 123/509 |
| 6,436,287 | B1 | * | 8/2002 | Fischerkeller ....... B01D 35/027 210/232 |
| 6,821,422 | B1 | * | 11/2004 | Brzozowski ....... B01D 35/0273 210/416.4 |
| 6,923,164 | B1 | * | 8/2005 | Mitsudou ............. F02M 37/103 123/509 |
| 6,936,168 | B2 | * | 8/2005 | Dockery ............ B01D 35/0273 210/232 |
| 6,939,467 | B2 | * | 9/2005 | Deichmann .......... F02M 37/106 210/416.4 |
| 7,112,278 | B2 | * | 9/2006 | Yamada ............. B01D 35/0273 210/232 |
| 7,182,869 | B2 | | 2/2007 | Catlin et al. |
| 7,210,465 | B2 | | 5/2007 | Ikeya |
| 7,455,053 | B2 | | 11/2008 | Nakagawa |
| 7,546,833 | B2 | | 6/2009 | Tomomatsu et al. |
| 7,628,143 | B2 | * | 12/2009 | Yamada ............... F02M 37/106 123/509 |
| 7,857,143 | B2 | * | 12/2010 | Oku ..................... F02M 37/106 210/416.4 |
| 8,038,877 | B2 | * | 10/2011 | Stausberg ............. B01D 29/52 184/6.24 |
| 8,173,013 | B2 | * | 5/2012 | Sato ................... B01D 35/0273 210/172.4 |
| 8,372,278 | B1 | * | 2/2013 | Nguyen ............. B01D 35/0273 123/196 A |
| 8,460,542 | B2 | * | 6/2013 | Oku .................... B01D 29/114 210/172.4 |
| 8,496,812 | B2 | * | 7/2013 | Beer .................. F01M 11/0004 210/167.03 |
| 8,715,497 | B2 | * | 5/2014 | Schnipke ........... B01D 35/0273 210/172.2 |
| 9,080,537 | B2 | * | 7/2015 | Choi .................... F02M 37/106 |
| 9,441,586 | B2 | * | 9/2016 | Akagi .................. F02M 37/22 |
| 9,470,193 | B2 | * | 10/2016 | Ries ....................... F02M 37/22 |
| 9,486,725 | B2 | * | 11/2016 | Ries ................... B01D 35/0276 |
| 9,573,085 | B2 | * | 2/2017 | Beer .................. F01M 11/0004 |
| 2002/0074270 | A1 | * | 6/2002 | Fischerkeller ....... B01D 35/027 210/97 |
| 2004/0144705 | A1 | | 7/2004 | Yamada et al. |
| 2005/0115887 | A1 | * | 6/2005 | Dockery ............ B01D 35/0273 210/416.4 |
| 2005/0236321 | A1 | * | 10/2005 | Usui .................. B01D 35/0273 210/416.4 |
| 2005/0286103 | A1 | * | 12/2005 | Yu ....................... F02M 37/106 123/509 |
| 2006/0070941 | A1 | * | 4/2006 | Cline ................. B01D 35/0276 210/416.4 |
| 2006/0076287 | A1 | * | 4/2006 | Catlin ................ B01D 35/0273 210/416.4 |
| 2006/0180535 | A1 | * | 8/2006 | Yu ..................... B01D 35/0273 210/172.3 |
| 2007/0199884 | A1 | * | 8/2007 | Nakagawa ......... B01D 35/0273 210/416.4 |
| 2008/0169033 | A1 | | 7/2008 | Tipton et al. |
| 2008/0245724 | A1 | | 10/2008 | Oku et al. |
| 2010/0206793 | A1 | | 8/2010 | Oku et al. |
| 2010/0206802 | A1 | * | 8/2010 | Sato ................... B01D 35/0273 210/490 |
| 2011/0132825 | A1 | | 6/2011 | Nishio |
| 2011/0155658 | A1 | * | 6/2011 | Graber ............... B01D 39/1623 210/243 |
| 2011/0180469 | A1 | * | 7/2011 | Sato ................... B01D 35/0273 210/172.4 |
| 2011/0192786 | A1 | * | 8/2011 | Nagai ..................... F02M 37/22 210/443 |
| 2012/0240901 | A1 | * | 9/2012 | Yamada ............... B01D 35/027 123/509 |
| 2014/0096849 | A1 | * | 4/2014 | Akagi .................. F02M 37/103 137/545 |

FOREIGN PATENT DOCUMENTS

| | | |
|---|---|---|
| FR | 2 755 735 | 9/1999 |
| JP | 62-16761 | 1/1987 |
| JP | 63-87261 | 6/1988 |
| JP | 02171328 | 7/1990 |
| JP | 2171328 A | 7/1990 |
| JP | 07180632 | 7/1995 |
| JP | 2001082274 | 3/2001 |
| JP | 2001-280210 A | 10/2001 |
| JP | 2004-239243 A | 8/2004 |
| JP | 2004245214 | 9/2004 |
| JP | 20069728 A | 1/2006 |
| JP | 2006-29317 A | 2/2006 |
| JP | 2006-105148 A | 4/2006 |
| JP | 2006-226222 A | 8/2006 |
| JP | 2007-9806 A | 1/2007 |
| JP | 2007-224748 | 9/2007 |
| JP | 2007-224881 A | 9/2007 |
| JP | 2007-255408 A | 10/2007 |
| JP | 2008533378 | 8/2008 |
| JP | 2009-68420 A | 4/2009 |
| WO | 2006097451 | 9/2006 |

OTHER PUBLICATIONS

Office Action dated Apr. 2, 2013 for Japanese Application No. 2009-276087 and English translation.
German Patent Office Action dated Feb. 25, 2013, (with English translation).
Japanese Office Action dated Oct. 29, 2013, corresponding to Japanese Patent Application No. 2009-276087; with English language translation.
Japan Institute of Invention and Innovation Journal of Technical Disclosure No. 2009-50696, published on Dec. 1, 2009; Please see the Japanese Office Action and English translation thereof for a concise explanation.
Japanese Office Action dated Jul. 21, 2015, corresponding to Japanese Patent Application No. 2014-130069; with English language translation.
German Office Action dated Dec. 14, 2015, corresponding to German Patent Application No. 102010053367.4.

\* cited by examiner

FILTERING DEVICE

This is a continuation application of application Ser. No. 12/955,293, filed Nov. 29, 2010, the contents of which are incorporated herein by reference.

BACKGROUND OF THE INVENTION

The present invention relates to a filtering device for filtering liquid fuel contained in a fuel tank. More particularly, the present invention relates to a filtering device that is used in a fuel-feeding device of an engine (an internal combustion engine) of an automobile or a motorcycle.

A fuel-feeding device of an engine is taught by, for example, Japanese Laid-Open Patent Publication No. 2-171328.

As shown in FIG. 32, the fuel-feeding device includes a bottomed reservoir cup 2, a fuel pump 5 that is capable of feeding (pumping) liquid fuel contained in a fuel tank 1 to the engine (not shown), and a filtering device. The reservoir cup 2 is disposed on a bottom wall of the fuel tank 1. The reservoir cup 2 has a fuel passage hole 4 that is formed in a side wall thereof. Also, the reservoir cup 2 has a pipe insertion hole 3 that is formed in another side wall thereof. The fuel pump 5 is disposed in the fuel tank 1. The fuel pump 5 includes a pump body 6 and a suction pipe 6a. The pump body 6 is attached to the reservoir cup 2. The suction pipe 6a is extended from the pump body 6 and is introduced into the reservoir cup 2 via the pipe insertion hole 3.

The filtering device includes a bag-shaped filter member 7 that is capable of filtering the fuel to be drawn by the fuel pump 5. The filter member 7 is disposed in the reservoir cup 2 and is connected to a distal end of the suction pipe 6a, so that contaminants contained in the fuel can be removed from the fuel before the fuel is introduced into the fuel pump 5.

According to the known filtering device, the fuel reserved in the reservoir cup 2 can be filtered by the filter member 7 and then be drawn by the fuel pump 5. However, the fuel that is not reserved in the reservoir cup 2 (which fuel may be referred to as "in-tank fuel") cannot be filtered by the filter member 7 and drawn by the fuel pump 5. This means that when the fuel is not reserved in the reservoir cup 2 even if the fuel is contained in the tank main body 1, the fuel cannot be fed to the engine. As a result, the engine cannot be operated. That is, the fuel cannot be efficiently used. This may lead to reduced operation time of the engine.

Thus, there is a need in the art for an improved filtering device.

BRIEF SUMMARY OF THE INVENTION

For example, in one embodiment of the present invention, a filtering device may includes a bag-shaped filter member that is capable of being connected to a fuel inlet port of a fuel pump disposed in a fuel tank in order to filtrate fuel drawn by the fuel pump, and a wall member that is connected to the filter member such that a fuel reservoir portion can be defined above the filter member.

According to the filtering device thus constructed, the filter member can function as a bottom wall of the fuel reservoir portion. Therefore, both of the fuel that is reserved in the fuel reservoir portion and the fuel that is contained in the fuel tank and not reserved in the fuel reservoir portion can be drawn by the fuel pump via the filter member. As a result, as long as the fuel is contained in the fuel tank even if the fuel is not reserved in the fuel reservoir portion (i.e., as long as the fuel remains in at least one of the fuel tank and the fuel reservoir portion), the fuel can be fed to the engine, so that the engine can be continuously operated. Thus, the fuel can be efficiently used, so that the engine can be operated for an extended period of time.

Optionally, the filter member can be an annular filter member having a central opening. Further, the filter member can have a bottom wall member that closes a central opening thereof to form a bottomed fuel reservoir recess. Further, the filtering device can further include an inner wall member disposed in the central opening of the filter member, Other objects, features, and advantages, of the present invention will be readily understood after reading the following detailed description together with the accompanying drawings and the claims.

DETAILED DESCRIPTION OF THE INVENTION

Next, the representative embodiments of the present invention will be described with reference to the drawings.

First Embodiment

A first embodiment of the present invention will be described with reference to FIGS. 1 to 15. This embodiment of the present invention is directed to a filtering device that is used in a fuel-feeding device of a vehicle engine (a vehicle internal combustion engine).

Figure 1:
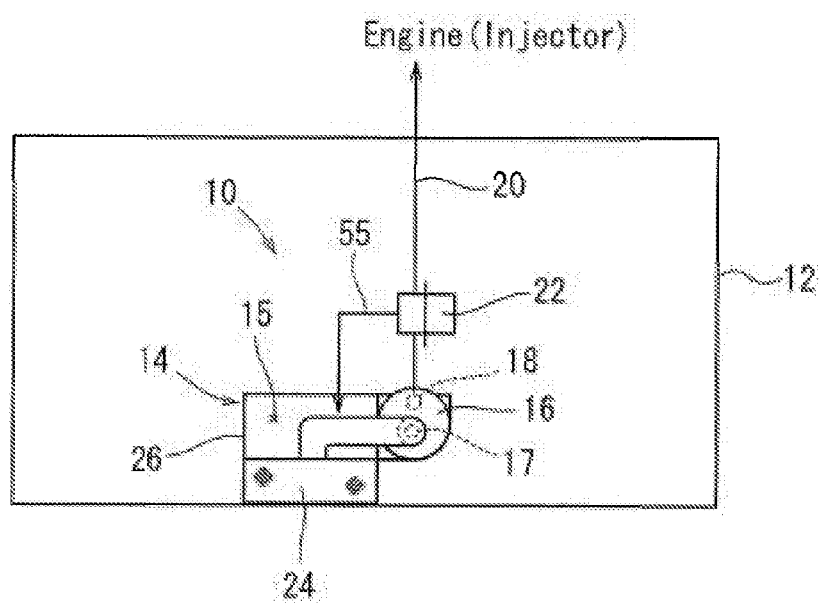
FIG. 1 is a schematic diagram of a fuel-feeding device that has a filtering device according to a first embodiment of the present invention.

First, the fuel-feeding device 10 is described. As shown in FIG. 1, the fuel-feeding device 10 may preferably be disposed in a hollow fuel tank 12 of a vehicle (not shown) in which liquid fuel is contained. The fuel-feeding device 10 may preferably include a filtering device 14 that is capable of functioning as a reservoir, an immersion type fuel pump 16 that is capable of feeding (pumping) the fuel contained in the fuel tank 12 to the engine, and a pressure regulator 22 that is connected to the fuel pump 16.

The filtering device 14 has a fuel reservoir portion 15 that is capable of reserving a portion of the fuel contained in the fuel tank 12 and an excess portion (return fuel) of the fuel pumped from the fuel pump 16.

Figure 2:
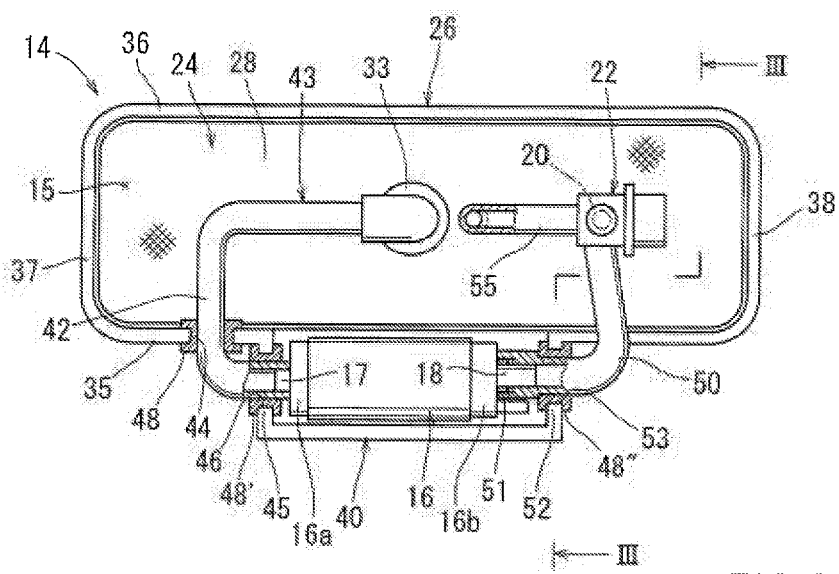
FIG. 2 is a plan view of the filtering device.

As shown in FIG. 2, the fuel pump 16 may preferably be composed of a pump portion 16a that is capable of drawing and pumping the fuel, and a motor portion 16b that is capable of driving the pump portion. That is, the fuel pump 16 is constructed as a fuel pump integrated with a motor. The pump portion 16a of the fuel pump 16 has a fuel inlet (suction) port 17. Conversely, the motor portion 16b of the fuel pump 16 has a fuel outlet (ejection) port 18. Upon actuation of the motor portion 16b, the pump portion 16a is driven, so that the fuel filtered by the filtering device 14 can be drawn into the pump portion 16a via the fuel inlet port 17. The fuel introduced into the pump portion 16a can be pressurized by rotation of an impeller (not shown) and then be introduced into the motor portion 16b. The pressurized fuel introduced into the motor portion 16b flows therethrough and is ejected from the fuel outlet port 18 formed therein. As shown in FIG. 1, the fuel ejected from the fuel inlet port 18 can be fed to the engine (in particular, an injector of the engine) via a fuel feeder pipe 20. Further, because the fuel pump 16 has a known structure, a detailed description of the fuel pump may be omitted.

The pressure regulator 22 is capable of controlling a pressure (i.e., a fuel pressure) of the fuel fed to the engine from the fuel pump 16 via the fuel feeder pipe 20. Further, the pressure regulator 22 is capable of discharging the excess portion of the fuel pumped from the fuel pump 16 into the fuel reservoir portion 15 of the filtering device 14 as the return fuel. Further, because the pressure regulator 22 has a known structure, a detailed description of the pressure regulator may be omitted. Further, in this embodiment, the filtering device 14, the fuel pump 16 and the pressure regulator 22 are modularized to form the fuel-feeding device 10.

Figure 3:
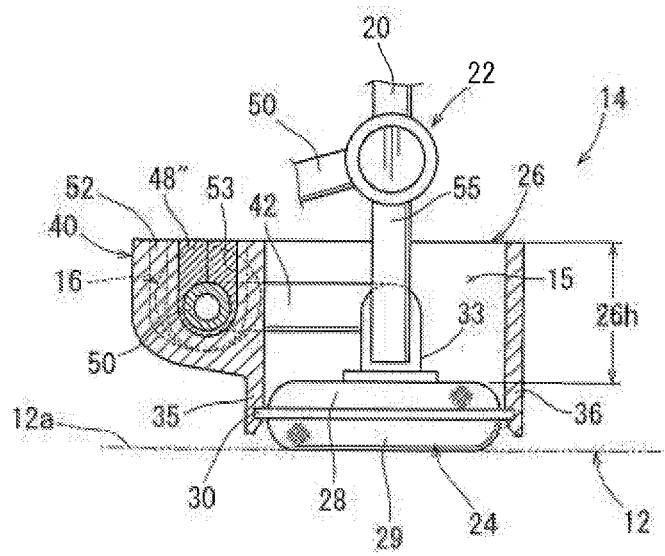
FIG. 3 is a sectional view taken along line of FIG. 2.
Figure 10:
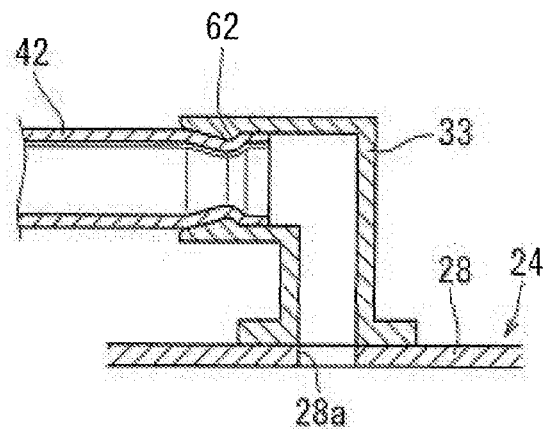
FIG. 10 is a sectional view, which illustrates a connection structure of a connector pipe and a drawing pipe.

Next, the filtering device 14 is described. As shown in FIGS. 2 and 3, the filtering device 14 may preferably be composed of a flat bag-shaped filter member 24 and a bottomless vertical wall member 26. The filter member 24 is constructed to filtrate the fuel to be drawn by the fuel pump 16. The filter member 24 may preferably be formed of mesh material or unwoven fabric made of resin. Further, as shown in FIG. 2, the filter member 24 has a laterally elongated rectangular shape in plan. In particular, as shown in FIG. 3, the filter member 24 is constructed of a dish-shaped upper filter element 28 and a dish-shaped lower filter element 29. Outer circumferential peripheries of the upper and lower filter elements 28 and 29 are entirely bonded to have a flange-shaped annular welding portion 30. As shown in FIG. 10, one end portion (a proximal end portion) of an L-shaped connector pipe 33 is connected to an upper surface of the filter member 24 (an upper surface of the upper filter element 28) at a central portion of the filter member 24. In other words, the connector pipe 33 is connected to a central portion of the upper surface of the filter member 24. As will be appreciated, the connector pipe 33 is communicated with an interior space of the filter member 24 via an opening 28a formed in the upper filter member 28. Thus, the proximal end portion of the connector pipe 33 is communicated with the interior space of the filter member 24 near the central portion of the filter member 24. Further, the other end portion (a distal end portion) of the connector pipe 33 is laterally (leftwardly) directed (FIG. 2).

As shown in FIG. 3, the filtering device 14 is disposed on a bottom surface 12a of the fuel tank 12 while a lower surface of the filter member 24 (the lower filter element 29) contacts the same. Further, the filtering device 14 has a resin frame member (not shown) that is received therein. Thus, the filtering device 14 can be maintained in an inflated condition.

As best shown in FIG. 2, the wall member 26 is made of resin and is shaped to circumferentially surround the filter member 24. The wall member 26 has a rectangular (annular) shape in plan and includes a pair of elongated wall portions (a front wall portion 35 and a rear wall portion 36) and a pair of shortened wall portions (a left wall portion 37 and a right wall portion 38).

As shown in FIG. 3, the filter member 24 is attached to the wall member 26, so as to close a lower opening of the wall member 26. In particular, the filter member 24 is attached to the wall member 26 such that the lower surface of the filter member 24 can contact the bottom surface 12a of the fuel tank 12 when the filtering device 24 is disposed in the fuel tank 12. (An attaching structure of the filter member 24 to the wall member 26 will be hereinafter described.) Thus, the fuel reservoir portion 15 of the filtering device 14 can be formed above the filter member 24. As will be appreciated, the filter member 24 may function as a bottom wall of the fuel reservoir portion 15. Further, a fuel film can be formed in the filter member 24 due to surface tension of the fuel. Therefore, the fuel reserved in the fuel reservoir portion 15 can be effectively prevented from flowing out through the filter member 24 as long as the fuel film is formed in the filter member 24. Further, a height 26h of the wall member 26 can be determined such that the fuel reservoir portion 15 can have a desired capacity.

As shown in FIGS. 2 and 3, the wall member 26 has a bottomed pump receiving portion 40 that is formed in a front surface of the front wall portion 35 thereof. In particular, the pump receiving portion 40 is formed in an upper central portion of the front wall portion 35. As best shown in FIG. 2, the fuel pump 16 is horizontally disposed within the pump receiving portion 40. At this time, the fuel pump 16 is positioned such that the fuel inlet port 17 and the fuel outlet port 18 are respectively directed leftwardly and rightwardly. Thus, the fuel pump 16 is positioned outside the fuel reservoir portion 15. Further, the fuel pump 16 is positioned on a side portion (in particular, a front side (a lower side in FIG. 2)) of the filter member 24 while the fuel pump 16 is positioned adjacent to the filter member 24. As will be appreciated, the pump receiving portion 40 is positioned outside the fuel reservoir portion 15, so as to not overlap the filter member 24 in plan. Therefore, the fuel reservoir portion 15 can have a sufficient capacity because the fuel reservoir portion 15 is not affected by the pump receiving portion 40.

As shown in FIG. 2, one end portion (a downstream end portion) of a suction pipe 42 is connected to the fuel inlet port 17 of the fuel pump 16. The suction pipe 42 may preferably be made of resin. Conversely, the other end portion (an upstream end portion) of a suction pipe 42 is connected to the other end portion (the distal end portion) of the connector pipe 33. (A connecting structure of the connector pipe 33 and the suction pipe 42 will be hereinafter described.) Further, the suction pipe 42 is held or secured in a U-shaped support groove 44 formed in the front wall portion 35 of the wall member 26 via a grommet 48. In addition, the suction pipe 42 is held or secured in a U-shaped support groove 46 formed in a left wall portion 45 of the pump receiving portion 40 via a grommet 48'. The suction pipe 42 and the connector pipe 33 constitute a suction pipe member 43. Further, one end portion (the proximal end portion) of the connector pipe 33 corresponds to an inlet portion of the suction pipe member 43.

As shown in FIG. 2, one end portion (an upstream end portion) of an ejection pipe 50 is connected to the fuel outlet port 18 of the fuel pump 16. An O-ring 51 is disposed between the fuel outlet port 18 and the ejection pipe 50. Further, the ejection pipe 50 is held or secured in a U-shaped support groove 53 formed in a right wall portion 52 of the pump receiving portion 40 via a grommet 48".

Thus, the suction pipe 42 and the ejection pipe 50 are respectively securely supported by the wall member 26, so that the fuel pump 16 can be securely received within the pump receiving portion 40. Further, all of the grommets 48, 48' and 48" have the same structure as each other. (A structure of each of the grommets 48, 48' and 48" will be hereinafter described.)

As shown in FIG. 2, the other end portion (a downstream end portion) of the ejection pipe 50 is connected to a fuel inlet port of the pressure regulator 22. Further, a fuel outlet port of the pressure regulator 22 is connected to one end portion (an upstream end portion) of the fuel feeder pipe 20. Further, a return fuel discharge port of the pressure regulator 22 is connected to one end portion (an upstream end portion) of a flow back pipe 55. The other end portion (a downstream end portion) of the flow back pipe 55 is introduced into the fuel reservoir portion 15. In particular, the other end portion of the flow back pipe 55 is introduced into the fuel reservoir portion 15 so as to be positioned adjacent to the proximal end portion of the connector pipe 33 on the right thereof.

Attaching Structure of Filter Member to Wall Member

Next, the attaching structure of the filter member 24 to the wall member 26 will be described.

Figure 4:
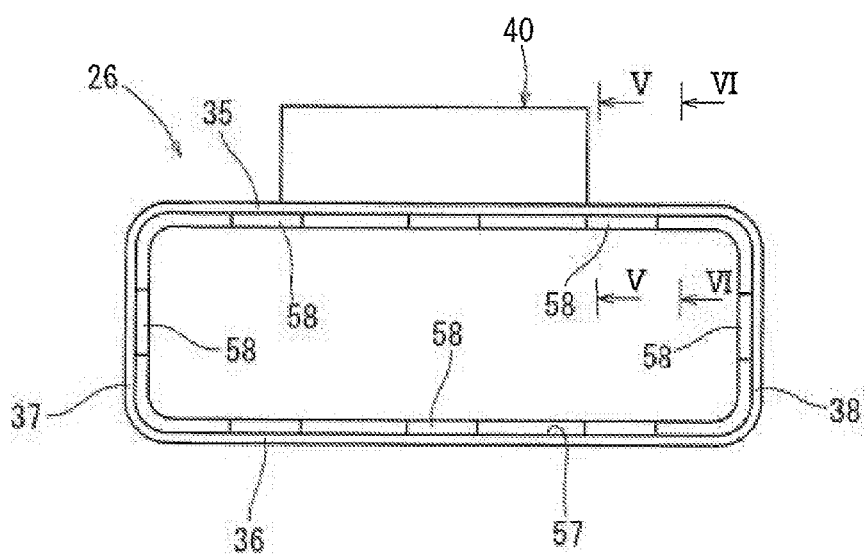
FIG. 4 is a bottom view of a wall member of the filtering device.
Figure 5:
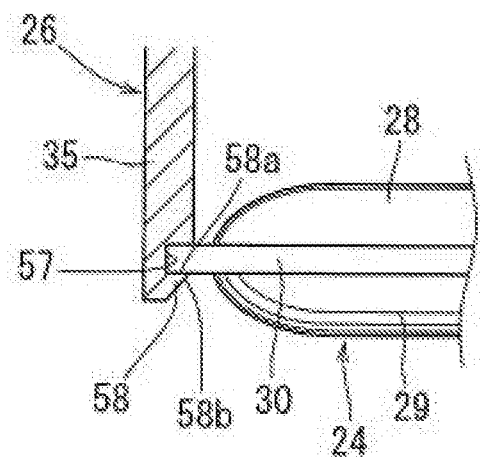
FIG. 5 is a sectional view taken along line V-V of FIG. 4.
Figure 6:
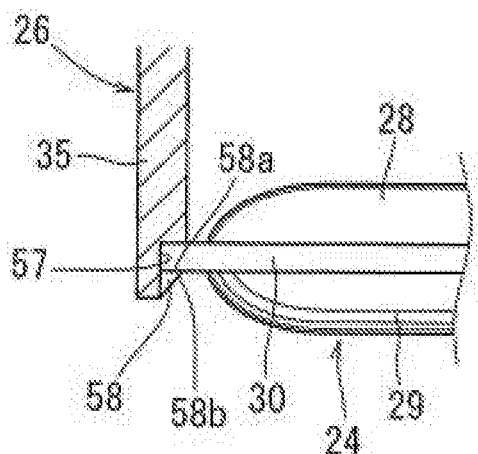
FIG. 6 is a sectional view taken along line VI-VI of FIG. 4.

As shown in FIGS. 4 to 6, the wall member 26 has an attachment recess 57 that is engageable with the annular welding portion 30 of the filter member 24. The attachment recess 57 is formed in an inner circumferential surface of a lower end portion of the wall member 26. Further, a plurality of (eight in this embodiment) elongated retainer projections 58 are formed in a lower end periphery of a circumferential surface (a recess bottom surface) of the attachment recess 57. As shown in FIG. 4, the retainer projections 58 are formed in the circumferential surface of the attachment recess 57 at desired intervals. In particular, three of the retainer projections 58 are positioned so as to correspond to the front wall portion 35 of the wall member 26. Similarly, three of the retainer projections 58 are positioned so as to correspond to the rear wall portion 36 of the wall member 26. Also, remaining two of the retainer projections 58 are respectively positioned so as to correspond to the right and left wall portions 37 and 38 of the wall member 26. As shown in FIGS. 5 and 6, each of the retainer projections 58 has a triangular shape in cross section, so as to have a horizontal retainer surface 58a and an inclined guide surface 58b. The guide surface 58b is inclined downwardly and outwardly from an inner end edge (a distal end edge) of each of the retainer projections 58.

In order to attach the filter member 24 to the wall member 26, the filter member 24 is pressed against the lower end portion of the wall member 26 from below. At this time, the filter member 24 can be pushed into the lower end portion of the wall member 26 while the filter member 24 is elastically deformed. As a result, the annular welding portion 30 of the filter member 24 can be introduced into the attachment recess 57 of the wall member 26 while a periphery of the annular welding portion 30 slides along the guide surface 58b of each of the retainer projections 58, so as to be fitted into the attachment recess 57 due to an elastic force (a restoring force) of the filter member 24 when the annular welding portion 30 clears the retainer projections 58. Thus, the filter member 24 can be attached to the wall member 26 while the annular welding portion 30 of the filter member 24 is held in the attachment recess 57 of the wall member 26 by the retainer surface 58a of each of the retainer projections 58.

Figure 7:
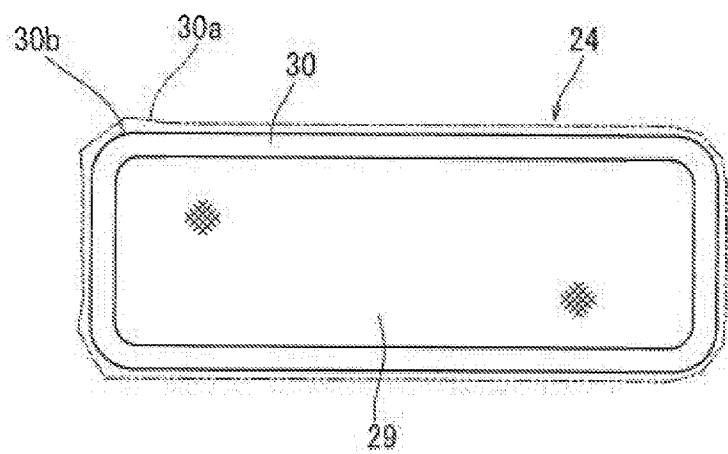
FIG. 7 is a bottom view of a filter member of the filtering device.

As shown by broken line 30a in FIG. 7, when the upper filter element 28 and the lower filter element 29 are bonded to form the filter member 24, the annular welding portion 30 of the filter member 24 may have a non-uniform external shape (size). Therefore, as shown by solid line 30b in FIG. 7, the annular welding portion 30 of the filter member 24 may preferably be trimmed to have a predetermined external shape that is capable of closely engaging the circumferential surface of the attachment recess 57 of the wall member 26.

In this embodiment, the annular welding portion 30 of the filter member 24 is trimmed such that the external shape 30b of the annular welding portion 30 is substantially identical to a shape (FIG. 4) of the circumferential surface of the attachment recess 57 of the wall member 26. However, the annular welding portion 30 is trimmed such that the external shape 30b thereof is slightly greater than the circumferential surface of the attachment recess 57 of the wall member 26. Therefore, when the annular welding portion 30 of the filter member 24 is fitted into the attachment recess 57 of the wall member 26, an end surface of the annular welding portion 30 can closely contact the circumferential surface of the attachment recess 57 due to the elastic force (the restoring force) of the filter member 24. As a result, sealing performance between the annular welding portion 30 and the wall portion 26 can be increased. Further, the annular welding portion 30 of the filter member 24 may preferably be formed such that an upper surface thereof can closely contact an upper (shoulder) surface of the attachment recess 57 when the annular welding portion 30 is fitted into the attachment recess 57. Such a structure can further increase the sealing performance between the annular welding portion 30 and the wall portion 26.

Figure 8:
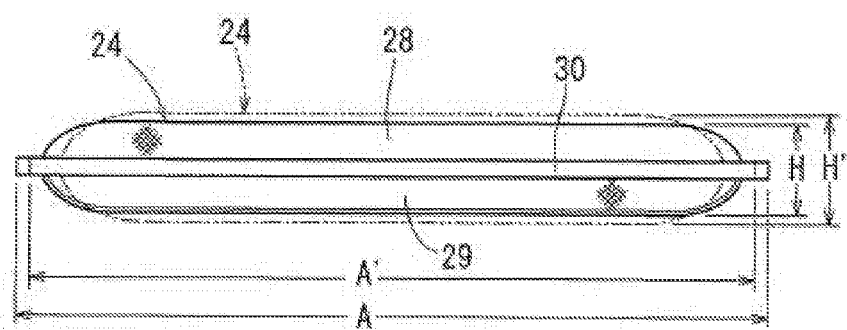
FIG. 8 is a side view of a filter member of the filtering device.

As shown by solid line in FIG. 8, the filter member 24 has an outer size A in a condition in which the filter member 24 is not attached to the wall member 26 (i.e., in a free or unattached condition). Conversely, as shown by broken line in FIG. 8, the filter member 24 has an outer size A' in a condition in which the filter member 24 is attached to the wall member 26 (i.e., in an attached condition). As will be apparent from FIG. 8, the outer size A' is smaller than the outer size A. Further, as shown by solid line in FIG. 8, the filter member 24 has a height H in the unattached condition. Conversely, as shown by broken line in FIG. 8, the filter member 24 has a height H' in the attached condition. As will be apparent from FIG. 8, the height H' is greater than the height H.

According to the attaching structure of the filter member 24 to the wall member 26 described above, the annular welding portion 30 of the filter member 24 can be elastically fitted into the attachment recess 57 of the wall member 26 using elastic deformation of the filter member 24. As a result, the sealing performance between the annular welding portion 30 and the wall portion 26 can be further increased.

The retainer projections 58 are formed in the attachment recess 57 of the wall member 26 in order to hold the annular welding portion 30 of the filter member 24. Therefore, the annular welding portion 30 of the filter member 24 fitted into the attachment recess 57 of the wall member 26 can be held in the attachment recess 57. Thus, the filter member 24 can be easily attached to and reliably held in the wall member 26.

Modified Form of Attachment Recess 57 of Wall Member 26

Figure 9:
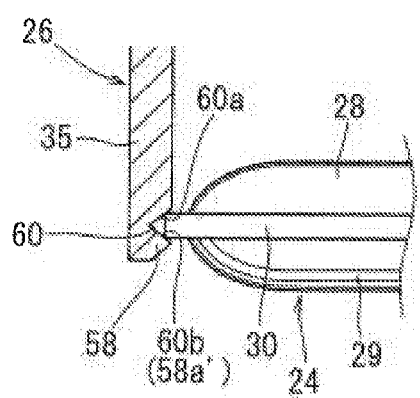
FIG. 9 is a view similar to FIG. 5, which illustrate a modified form of the wall member of the filtering device.

The attachment recess 57 of the wall member 26 of this embodiment can be modified. As shown in FIG. 9, in this modified form, the wall member 26 has an attachment recess 60 in place of the attachment recess 57. The attachment recess 60 has a V-shape in cross section and has upper and lower inclined surfaces 60a and 60b. Further, in this modified form, the lower inclined surface 60b defines a retainer surface 58a' of each of the retainer projections 58.

Connecting Structure of Connector Pipe 33 and Suction Pipe 42

Next, the connecting structure of the connector pipe 33 and the suction pipe 42 will be described.

As shown in FIG. 10, the connector pipe 33 has a tapered portion 62 that is formed in an inner circumferential surface of the distal end portion thereof. The tapered portion 62 is inwardly tapered such that an inner diameter of the distal end portion of the connector pipe 33 can be inwardly reduced. The upstream end portion of the suction pipe 42 is closely fitted into the distal end portion of the connector pipe 33 by press fitting using elastic deformation thereof. Thus, the upstream end portion of the suction pipe 42 can be connected to the distal end portion of the connector pipe 33 in a hermetically sealed condition. Further, in this embodiment, a soft resin pipe may preferably be used as the suction pipe 42.

First Modified Form of Connecting Structure of Connector Pipe 33 and Suction Pipe 42

The connecting structure of the connector pipe 33 and the suction pipe 42 can be modified.

Figure 11:
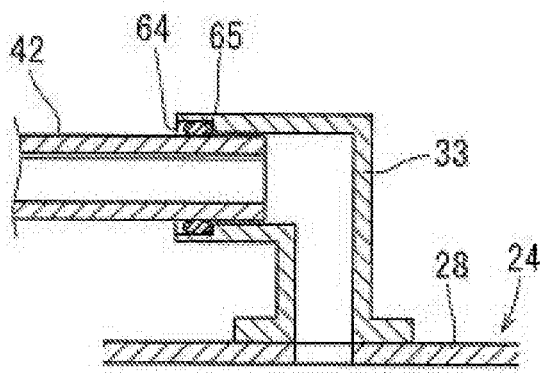
FIG. 11 is a view similar to FIG. 10, which illustrate a first modified form of the connection structure of the connector pipe and the drawing pipe.

As shown in FIG. 11, in this modified form, the connector pipe 33 has an annular groove 64 instead of the tapered portion 62. The annular groove 64 is formed in the inner circumferential surface of the distal end portion of the connector pipe 33. Further, an O-ring 65 having a circular shape in cross section is fitted into the annular groove 64. The upstream end portion of the suction pipe 42 is closely fitted into the distal end portion of the connector pipe 33 using elastic deformation of the O-ring 65. Further, in this modified form, a hard or rigid resin pipe can be used as the suction pipe 42.

Second Modified Form of Connecting Structure of Connector Pipe 33 and Suction Pipe 42

Figure 12:
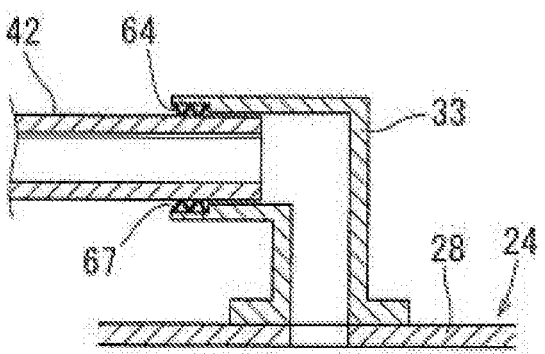
FIG. 12 is a view similar to FIG. 10, which illustrate a second modified form of the connection structure of the connector pipe and the drawing pipe.

As shown in FIG. 12, in this modified form, the O-ring 65 used in the first modified form is simply replaced with an O-ring 67 having a corrugated shape in cross section.

Structure of Each of Grommets 48 (48' and 48")

Figure 15:
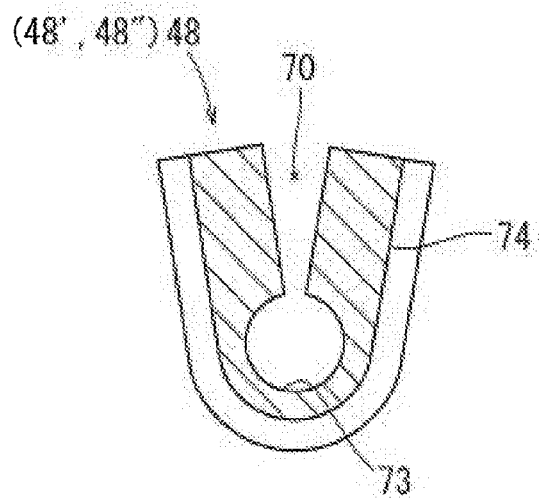
FIG. 15 is a sectional view taken along line XV-XV of FIG. 14.

Next, the structure of each of the grommets 48, 48' and 48" will be described. As previously described, because all of the grommets 48, 48' and 48" have the substantially same structure as each other, the structure of the grommet 48 will be described. The grommet 48 is made of a rubber-like elastic material. As best shown in FIG. 15, the grommet 48 is formed as a spread U-shaped member having a vertical split groove 70. The grommet 48 further includes a pipe receiving groove 73 that is formed in a bottom portion thereof. The pipe receiving groove 73 is continuous with the sprit groove 70 and has a substantially circular shape in cross section. The pipe receiving groove 73 is shaped to receive the suction pipe 42 or the ejection pipe 50 (FIG. 2) via the split groove 70. Further, as best shown in FIGS. 13 and 15, the grommet 48 has an attachment groove 74 that is vertically formed in an outer circumferential surface.

Figure 13:
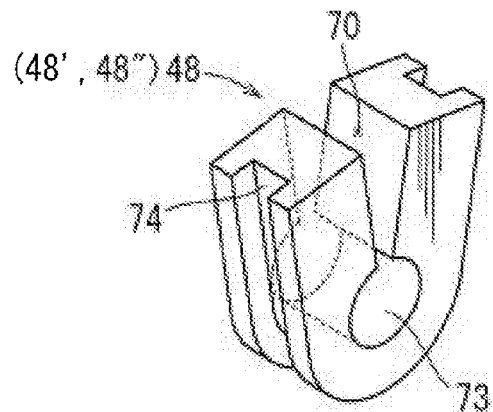
FIG. 13 is a perspective view of a grommet used in the filtering device.
Figure 14:
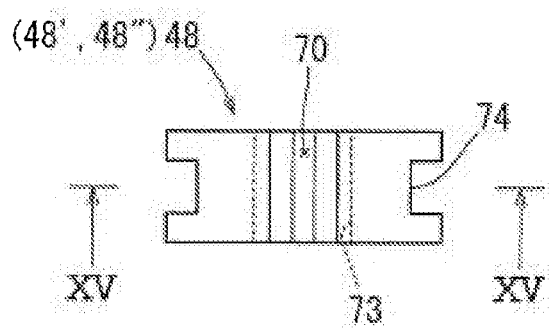
FIG. 14 is a plan view of the grommet.

In order to attach the suction pipe 42 and the ejection pipe 50 to the wall member 26, the suction pipe 42 and the ejection pipe 50 are respectively radially inserted into the pipe receiving groove 73 of each of the grommets 48, 48' and 48" via the sprit groove 70 thereof in a free condition of each of the grommets 48, 48' and 48" (FIGS. 13 to 15). Thereafter, each of the grommets 48, 48' and 48" is pushed into each of the support grooves 44, 46 and 53 of the wall member 26 along the attachment groove 74 formed therein. As a result, the grommets 48, 48' and 48" can be fitted into and held in the support grooves 44, 46 and 53 while they are elastically deformed. (Only the grommet 48" is shown in FIG. 3.) At this time, the split groove 70 of each of the grommets 48, 48' and 48" is closed, so that the suction pipe 42 and the ejection pipe 50 can be closely (hermetically) held in the pipe receiving groove 73. Thus, the suction pipe 42 and the ejection pipe 50 can be elastically supported on the wall member 26 via the grommets 48, 48' and 48". The grommets 48, 48' and 48" can absorb vibration of the fuel pump 16, thereby reducing generation of noise. Further, the grommet 48 positioned on the front wall portion 35 of the wall member 26 can seal between the suction pipe 42 and the wall member 26 (the front wall portion 35), so that the fuel reserved in the fuel reservoir portion 15 can be prevented from leaking out of the fuel reservoir portion 15.

As described above, the filtering device 14 has the filter member 24 and the wall member 26. The filter member 24 is connected to the fuel inlet port 17 of the fuel pump 16 disposed in the fuel tank 12 via the suction pipe 42 in order to filtrate the fuel to be drawn by the fuel pump 16.

Conversely, the wall member 26 is combined with the filter member 24 such that the fuel reservoir portion 15 can be defined above the filter member 24 (FIGS. 2 and 3). In other words, the wall member 26 is combined with the filter member 24 such that the filter member 24 can function as the bottom wall of the fuel reservoir portion 15. Therefore, both of the fuel that is reserved in the fuel reservoir portion 15 and the fuel that is contained in the fuel tank 12 and not reserved in the fuel reservoir portion 15 (the latter fuel may be simply referred to as "in-tank fuel") can be drawn by the fuel pump 16 via the filter member 24 (the upper filter element 28 and/or the lower filter element 29). As a result, as long as the fuel is contained in the fuel tank 12 even if the fuel is not reserved in the fuel reservoir portion 15 (i.e., as long as the fuel remains in at least one of the fuel tank 12 and the fuel reservoir portion 15), the fuel can be drawn by the fuel pump 16 and is fed to the engine, so that the engine can be continuously operated. Thus, the fuel can be efficiently used, so that the engine can be operated for an extended period of time.

Further, the fuel pump 16 is positioned outside the fuel reservoir portion 15 (FIGS. 2 and 3). Therefore, the fuel reservoir portion 15 can reserve a large amount of fuel therein.

The fuel pump 16 is positioned adjacent to the filter ember 24 on the front side (the lower side in FIG. 2) thereof. Therefore, the fuel pump 16 can be horizontally compactly arranged in the filtering device 14.

As shown in FIG. 2, the fuel pump 16 is horizontally disposed within the pump receiving portion 40. Therefore, the fuel pump 16 can be vertically compactly arranged in the filtering device 14. This arrangement is more suitable for the flat-type fuel tank 12 having a reduced height.

Further, the inlet portion of the suction pipe member 43 (the proximal end portion of the connector pipe 33) communicated with the fuel inlet port 17 of the fuel pump 16 is connected to the central portion of the upper surface of the filter member 24. That is, the inlet portion of the suction pipe member 43 is connected to the upper surface of the filter member 24 at the central portion of the filter member 24. Thus, the proximal end portion of the connector pipe 33 is communicated with the interior space of the filter member 24 at the central portion of the filter member 24. Therefore, even when the fuel tank 12 is inclined in a condition in which the fuel contained in the fuel tank 12 is reduced, the fuel can be continuously drawn by the fuel pump 16, so as to be fed to the engine. Thus, discontinuous combustion of the engine can be effectively avoided.

Further, because the excess portion of the fuel pumped from the fuel pump 16 can be returned into the fuel reservoir portion 15 of the filtering device 14 as the return fuel, a substantial amount of fuel can be constantly reserved in the fuel reservoir portion 15. Therefore, the fuel reserved in the fuel reservoir portion 15 can be drawn by the fuel pump 16 via the filter member 24 even if the filter member 24 cannot contact or substantially contact the in-tank fuel (i.e., the fuel that is contained in the fuel tank 12 and not reserved in the fuel reservoir portion 15) as a result of the fact that the fuel contained in the fuel tank 12 is reduced. Thus, even when the fuel contained in the fuel tank 12 is reduced, the fuel can be continuously fed to the engine, so that the engine can be stably operated for an extended period of time.

Second Embodiment

The second detailed representative embodiment will now described with reference to FIGS. 16 and 17.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 16:
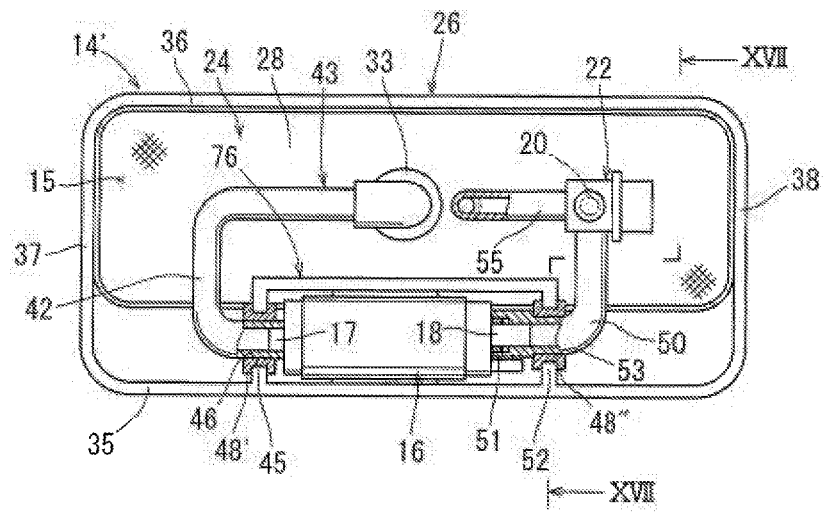
FIG. 16 is a plan view of a filtering device according to a second embodiment of the present invention.
Figure 17:
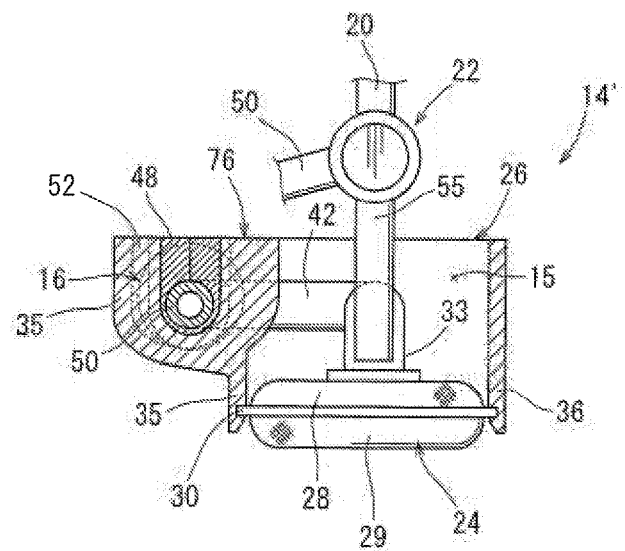
FIG. 17 is a sectional view taken along line XVII-XVII of FIG. 16.

As shown in FIGS. 16 and 17, in a filtering device 14' of this embodiment, an upper portion of the front wall portion 35 of the wall member 26 is forwardly projected. The wall member 26 has a bottomed pump receiving portion 76 that is similar to the pump receiving portion 40 of the first embodiment. Similar to the pump receiving portion 40 of the first embodiment, the pump receiving portion 76 is formed in an upper central portion of the front wall portion 35. However, unlike the first embodiment, the pump receiving portion 76 is formed in a rear surface of the front wall portion 35 of the wall member 26.

Further, in this embodiment, the wall member 26 does not have a support groove corresponding to the support groove 44 formed in the front wall portion 35 of the wall member 26 in the first embodiment. Therefore, the grommet 48 used in the first embodiment is omitted.

The filtering device 14' thus constructed may have the substantially same functions and effects as the filtering device 14 of the first embodiment.

Third Embodiment

The third detailed representative embodiment will now described with reference to FIGS. 18 to 20.

Because the third embodiment relates to the first embodiment, only the constructions and elements that are different from the first embodiment will be explained in detail. Elements that are the same in the first and third embodiments will be identified by the same reference numerals and a detailed description of such elements may be omitted.

Figure 18:
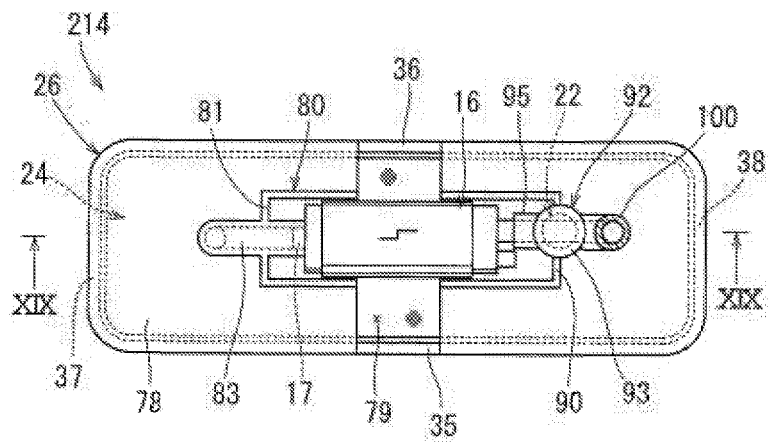
FIG. 18 is a plan view of a filtering device according to a third embodiment of the present invention.
Figure 19:
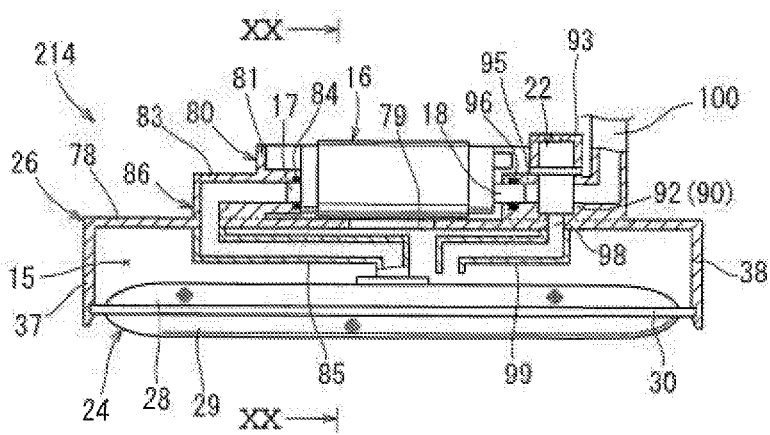
FIG. 19 is a sectional view taken along line XIX-XIX of FIG. 18.
Figure 20:
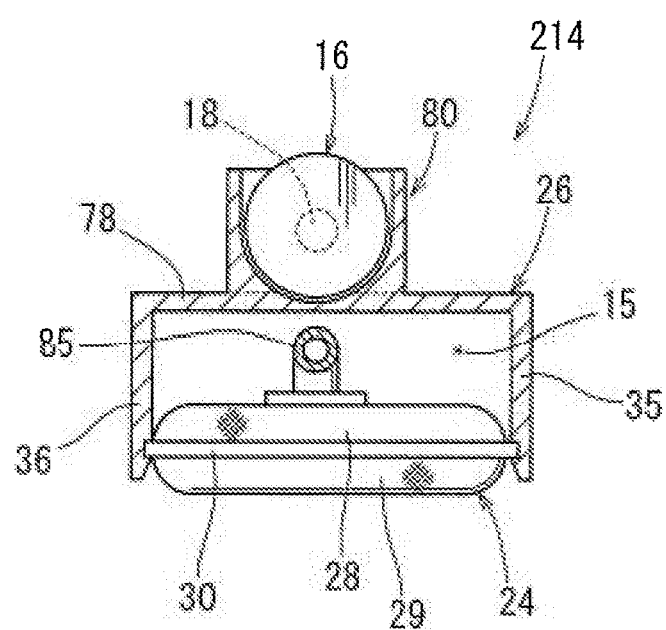
FIG. 20 is a sectional view taken along line XX-XX of FIG. 19.

As shown in FIGS. 18 to 20, in a filtering device 214 of this embodiment, the pump receiving portion 40 of the wall member 26 in the first embodiment is omitted. Instead, in this embodiment, the wall member 26 has a lid portion 78 that is capable of closing an upper opening thereof. The lid portion 78 has a fuel flow opening 79. The fuel flow opening 79 is formed in a laterally central portion of the lid portion 78 so as to extend backward and forward (upward and downward in FIG. 18). Therefore, when the fuel in the fuel tank 12 (the in-tank fuel) has a fuel level higher than the fuel flow opening 79, the fuel in the fuel tank 12 can be introduced into the fuel reservoir portion 15 through the fuel flow opening 79.

The lid portion 78 has an open-topped and bottomed pump receiving portion 80 that is formed in an upper surface thereof. The pump receiving portion 80 is formed in a laterally central portion of the lid portion 78 and is laterally divided by the fuel flow opening 79. The fuel pump 16 is horizontally disposed within the pump receiving portion 80. At this time, the fuel pump 16 is positioned such that the fuel inlet port 17 and the fuel outlet port 18 are respectively directed leftwardly and rightwardly. Thus, the fuel pump 16 is positioned above the fuel reservoir portion 15.

As shown in FIGS. 18 and 19, an inlet conduit portion 83 is formed in a left wall portion 81 of the pump receiving portion 80. One end portion (a downstream end portion) of the inlet conduit portion 83 is projected into the pump receiving portion 80 and is connected to the fuel inlet port 17 of the fuel pump 16. An O-ring 84 is disposed between the inlet conduit portion 83 and the fuel inlet port 17.

Conversely, the other end portion (an upstream end portion) of the inlet conduit portion 83 is connected to the lid portion 78 so as to be opened into the fuel reservoir portion 15.

In this embodiment, the L-shaped connector pipe 33 of the first embodiment is replaced with a crank-shaped connector pipe 85. One end portion (an upstream end portion) of the connector pipe 85 is connected to the upper surface of the filter member 24 (the upper filter element 28) at the central portion of the filter member 24. Conversely, the other end portion (a downstream end portion) of the connector pipe 85 is connected to the upstream end portion of the inlet conduit portion 83 connected to the lid portion 78 such that the connector pipe 85 and the inlet conduit portion 83 are communicated with each other. In this embodiment, the inlet conduit portion 83 and the connector pipe 85 constitute a suction pipe member 86.

As shown in FIG. 18, an open-topped and bottomed cylindrical pressure regulator receiving portion 92 is formed in a right wall portion 90 of the pump receiving portion 80. The pressure regulator 22 is disposed within the pressure regulator receiving portion 92. Further, the pressure regulator receiving portion 92 is provided with a fixture member 93, so that the pressure regulator 22 can be held within the pressure regulator receiving portion 92. As shown in FIGS. 18 and 19, an ejection pipe portion 95 is formed in a left wall portion of the pressure regulator receiving portion 92. One end portion of the ejection pipe portion 95 is communicated with a fuel inlet of the pressure regulator 22. Conversely, the other end portion of the ejection pipe portion 95 is projected into the pump receiving portion 80 and is connected to the fuel outlet port 18 of the fuel pump 16. An O-ring 96 is disposed between the fuel outlet port 18 and the ejection pipe portion 95.

As shown in FIG. 19, a flow back port 98 is formed in a bottom wall portion of the pressure regulator receiving portion 92. The flow back port 98 is communicated with the return fuel discharge port of the pressure regulator 22 and penetrates the lid portion 78 to open in a lower surface of the lid portion 78. Further, a crank-shaped flow back pipe portion 99 is formed in the lower surface of the lid portion 78. One end portion (an upstream end portion) of the flow back pipe portion 99 is connected to the flow back port 98. Conversely, the other end portion (a downstream end portion) of the flow back pipe portion 99 is positioned adjacent to a right side of the upstream end portion of connector pipe 85 and is opened toward the upper filter element 28 of the filter member 24. In addition, a fuel feeder pipe portion 100 is formed in a right wall portion of the pressure regulator receiving portion 92. One end portion of the fuel feeder pipe portion 100 is communicated with a fuel outlet of the pressure regulator 22. Conversely, the other end portion (a downstream end portion) of the fuel feeder pipe portion 100 is connected to the upstream end portion of the fuel feeder pipe 20 (FIG. 1).

According to the filtering device 214, upon operation of the engine, the fuel pump 16 is actuated. As a result, the fuel contained in the fuel tank 12 and the fuel reserved in the fuel reservoir portion 15 can be filtered by the filter member 24 and then be drawn into the fuel pump 16 via the connector pipe 85, the inlet conduit portion 83 and the fuel inlet port 17 of the fuel pump 16. The fuel drawn into the fuel pump 16 can be pressurized therein and then be ejected from the fuel outlet port 18 of the fuel pump 16. The fuel ejected from the fuel inlet port 18 can be introduced into the pressure regulator 22 via the ejection pipe portion 95 in order to control the pressure (the fuel pressure) of the fuel. The pressure controlled fuel in the pressure regulator 22 can be fed to the engine via the fuel feeder pipe portion 100 and the fuel feeder pipe 20. Conversely, the return fuel discharged from the pressure regulator 22 can be returned onto the filter member 24 (i.e., into the fuel reservoir portion 15) via the flow back port 98 and the flow back pipe portion 99.

The filtering device 214 thus constructed may have the substantially same functions and effects as the filtering device 14 of the first embodiment. Further, in this embodiment, the fuel pump 16 is positioned above the fuel reservoir portion 15. Therefore, the fuel pump 16 can be horizontally compactly arranged in the filtering device 214.

Further, the flow back pipe portion 99 can be omitted. In other words, the return fuel discharged from the pressure regulator 22 can be directly returned into the fuel reservoir portion 15 via the flow back port 98.

Fourth Embodiment

The fourth detailed representative embodiment will now described with reference to FIGS. 21 and 22.

Because the fourth embodiment relates to the first embodiment, only the constructions and elements that are different from the first embodiment will be explained in detail. Elements that are the same in the first and fourth embodiments will be identified by the same reference numerals and a detailed description of such elements may be omitted.

Figure 21:
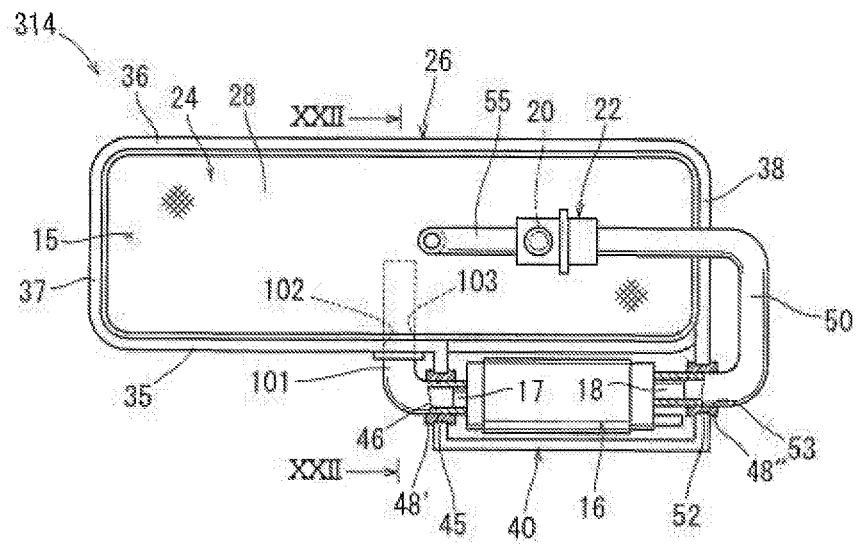
FIG. 21 is a plan view of a filtering device according to a fourth embodiment of the present invention.
Figure 22:
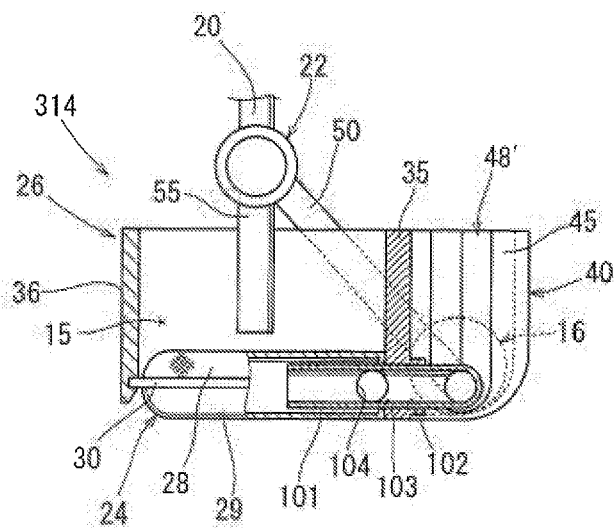
FIG. 22 is a sectional view taken along line XXII-XXII of FIG. 21.

As shown in FIG. 21, in a filtering device 314 of this embodiment, the pump receiving portion 40 is shifted rightwardly such that the right wall portion 52 thereof can be aligned with the right wall portion 38 of the wall member 26. In addition, as shown in FIG. 22, the pump receiving portion 40 is elongated downwardly such that a lower (bottom) surface thereof can be flush with the lower surface of the filter member 24 (the lower filter element 29).

Further, in this embodiment, as shown in FIG. 21, the suction pipe 42 is replaced with a suction pipe 101. An upstream section of the suction pipe 101 is inserted into both of a pipe insertion hole 102 that is formed in a lower central portion of the front wall portion 35 of the wall member 26 and a pipe joint hole 103 that is formed in the filter member 24, so as to be communicated with the interior space of the filter member 24. The pipe joint hole 103 is formed in a front side surface (a front portion of an annular side surface) of the filter member 24 at the central portion of the filter member 24. In other words, the pipe joint hole 103 is formed in a central portion of the front side surface of the filter member 24. Further, the upstream section of the suction pipe 101 may preferably be projected into the interior space of the filter member 24 such that an upstream end portion of the suction pipe 101 reaches a central portion of the interior space of the filter member 24. Thus, the upstream end portion of the suction pipe 101 is communicated with the interior space of the filter member 24 at the central portion of the filter member 24. Further, as shown in FIG. 22, the suction pipe 101 has a pair of fuel suction openings 104 that are opened into the interior space of the filter member 24. The fuel suction openings 104 may preferably be laterally oppositely formed. Further, in this embodiment, the connector pipe 33 used in the first embodiment is omitted.

In this embodiment, the suction pipe 101 constitutes a suction pipe member. Further, the upstream end portion of the suction pipe 101 may be referred to as an inlet portion of the suction pipe member.

As best shown in FIG. 21, a downstream end portion of the suction pipe 101 is connected to the fuel inlet port 17 of the fuel pump 16. Similar to the suction pipe 42 of the first embodiment, the suction pipe 101 is retained in the U-shaped support groove 46 formed in the left wall portion 45 of the pump receiving portion 40 via the grommet 48'. Further, as shown in FIG. 22, in this embodiment, the support groove 46 and the grommet 48' are respectively modified in vertical sizes. That is, the support groove 46 and the grommet 48' respectively have shapes that are vertically longer than the support groove 46 and the grommet 48' in the first embodiment. Similarly, the support groove 53 and the grommet 48" respectively have shapes that are vertically longer than the support groove 53 and the grommet 48'" in the first embodiment.

The filtering device 314 thus constructed may have the substantially same functions and effects as the filtering device 14 of the first embodiment. Further, as shown in FIG. 22, in this embodiment, the fuel pump 16 can be positioned on a lower portion in the filtering device 314. That is, the fuel pump 16 can be disposed in the same level as the filter member 24. Therefore, the fuel inlet port 17 of the fuel pump 16 can be positioned on the substantially same level as the upstream end portion of the suction pipe 101 positioned in the interior space of the filter member 24. In other words, a level difference between the fuel inlet port 17 of the fuel pump 16 and a fuel suction position of the suction pipe 101 can be minimized. As a result, a fuel suction force of the fuel pump 16 can be effectively prevented from being reduced. Further, the suction pipe 101 (the suction pipe member) that is communicated with the fuel inlet port 17 of the fuel pump 16 is connected to the pipe joint hole 103 that is formed in the central portion of the front side surface of the filter member 24. In addition, the upstream end portion of the suction pipe 101 (the inlet portion of the suction pipe member) is positioned at the central portion of the interior space of the filter member 24. Therefore, even when the fuel contained in the fuel tank 12 is reduced, the fuel can be drawn by the fuel pump 16, so as to be continuously fed to the engine. Thus, the discontinuous combustion of the engine can be further effectively avoided.

Fifth Embodiment

The fifth detailed representative embodiment will now described with reference to FIGS. 23 to 25.

Because the fifth embodiment relates to the first embodiment, only the constructions and elements that are different from the first embodiment will be explained in detail. Elements that are the same in the first and fifth embodiments will be identified by the same reference numerals and a detailed description of such elements may be omitted.

Figure 23:
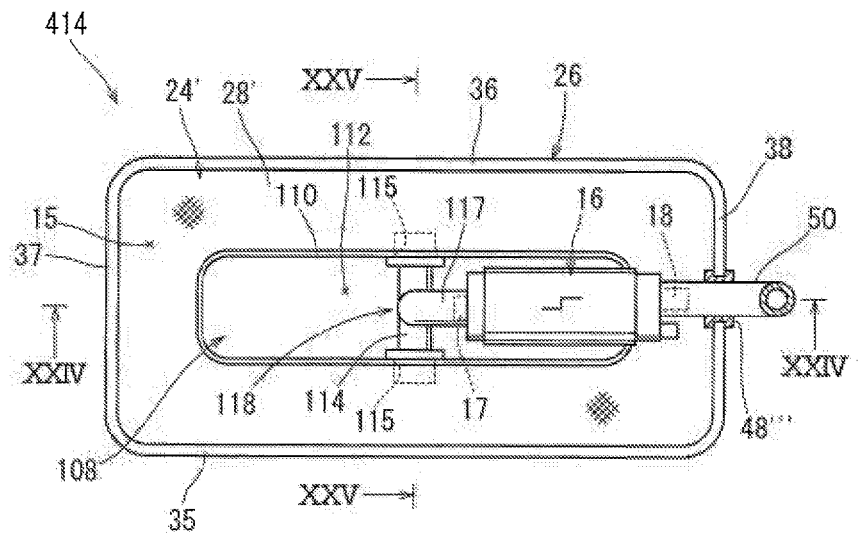
FIG. 23 is a plan view of a filtering device according to a fifth embodiment of the present invention.
Figure 24:
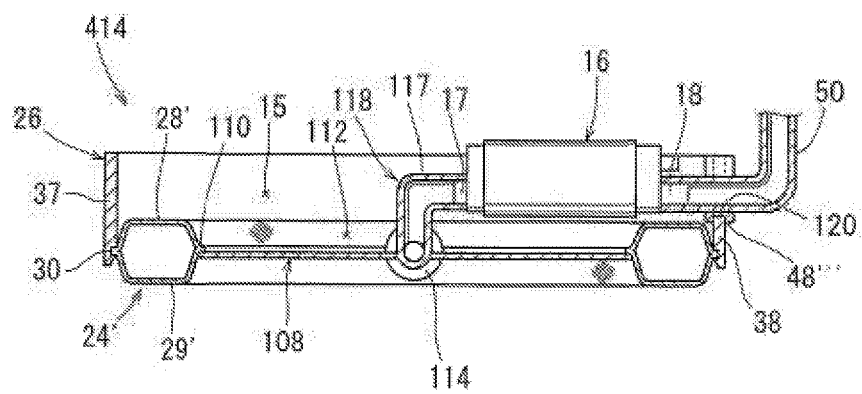
FIG. 24 is a sectional view taken along line XXIV-XXIV of FIG. 23.
Figure 25:
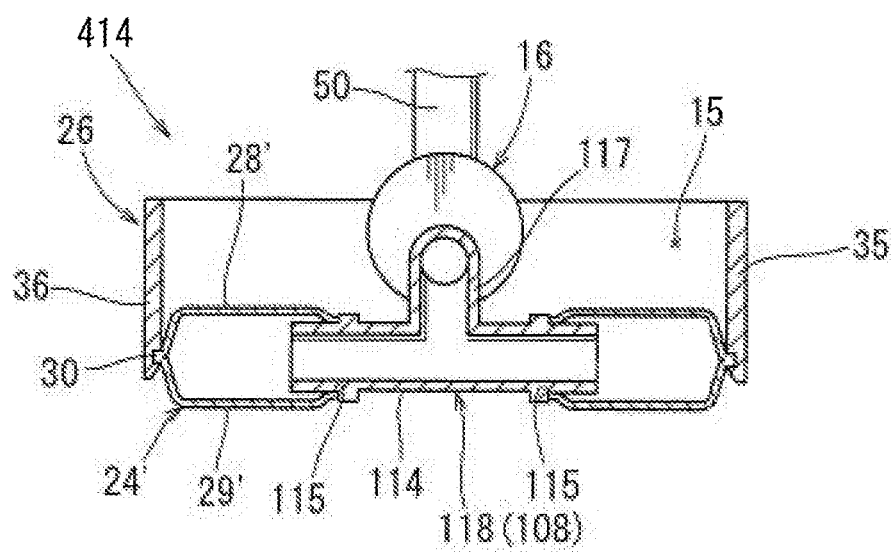
FIG. 25 is a sectional view taken along line XXV-XXV of FIG. 23.

As shown in FIGS. 23 and 24, in a filtering device 414 of this embodiment, the pump receiving portion 40 of the wall member 26 in the first embodiment is omitted. Further, in this embodiment, the filter member 24 of the first embodiment is replaced with an annular filter member 24' having a laterally elongated rectangular annular shape. The filter member 24' is shaped to extend along an inner circumferential (side) surface of the wall member 26 and has an elongated rectangular central opening. In particular, the filter member 24' is constructed of a rectangular annular gutter-shaped upper filter element 28' and a rectangular annular gutter-shaped lower filter element 29'. Similar to the upper and lower filter elements 28 and 29 in the first embodiment, outer circumferential peripheries of the upper and lower filter elements 28' and 29' are entirely bonded via the annular welding portion 30. Further, inner circumferential peripheries of the upper and lower filter elements 28' and 29' are entirely bonded to have a flange-shaped annular welding portion 110.

As shown in FIGS. 23 and 24, the filter member 24' includes a bottom wall member (closure member) 108 that is capable of closing the central opening of the filter member 24'. As shown in FIG. 23, the bottom wall member 108 may preferably have an elongated rectangular shape corresponding to a shape of the central opening of the filter member 24'. The bottom wall member 108 is made of resin and is circumferentially bonded to a lower surface of the annular welding portion 110 of the filter member 24'. Therefore, as best shown in FIG. 24, the filter member 24' can have a bottomed fuel reservoir recess 112 that is defined by an inner circumferential (side) surface of the upper filter element 28' and an upper surface of the bottom wall member 108. Thus, in this embodiment, the fuel reservoir recess 112 thus formed is encircled by the upper filter element 28' and is positioned below the fuel reservoir portion 15.

The filter member 24' (FIG. 23) may preferably have a project area (a width and a length) greater than the filter member 24 (FIG. 2) of the first embodiment, so as to have the same filtration area as the filter member 24. Further, the bottom wall member 108 can be bonded to a portion other than the lower surface of the annular welding portion 110 of the filter member 24' provided that the fuel reservoir recess 112 can be encircled by at least a portion of the filter member 24'.

As shown in FIG. 23, the bottom wall member 108 has a straight suction pipe portion 114 that is formed in a laterally central portion thereof so as to extend backward and forward (upward and downward in FIG. 23). As shown in FIGS. 23 and 25, end portions of the suction pipe portion 114 are respectively inserted into pipe connecting ports 115 that are formed in the filter member 24', so that the suction pipe portion 114 can be communicated with an interior space of the filter member 24'. The pipe connecting ports 115 are oppositely formed in front and rear inner side surfaces (front and rear portions of an annular inner side surface) of the filter member 24' at a central portion of the filter member 24'. In other words, the pipe connecting ports 115 are oppositely formed in central portions of the front and rear inner side surfaces of the filter member 24'. Thus, the end portions of the suction pipe portion 114 are communicated with the interior space of the filter member 24' at the central portion of the filter member 24'.

In this embodiment, the fuel pump 16 is horizontally disposed in the fuel reservoir portion 15. The fuel pump 16 is positioned above the filter member 24'. The fuel pump 16 is positioned adjacent to the filter member 24' while the fuel inlet port 17 and the fuel outlet port 18 are respectively directed leftwardly and rightwardly.

As best shown in FIG. 24, the suction pipe portion 114 has an L-shaped connecting pipe portion 117 that is integrally formed in an upper central portion thereof. An upper end portion of the connecting pipe portion 117 is bent rightwardly and is connected to the fuel inlet port 17 of the fuel pump 16. In this embodiment, the suction pipe portion 114 and the connecting pipe portion 117 constitute a suction pipe member 118.

As shown in FIGS. 23 and 24, similar to the first embodiment, the upstream end portion of the ejection pipe 50 is connected to the fuel outlet port 18 of the fuel pump 16. Further, unlike the first embodiment, the ejection pipe 50 is held in a U-shaped support groove 120 formed in a right wall portion 38 of the wall member 26 via a grommet 48'". Thus, the fuel pump 16 can be secured within the fuel reservoir portion 15 while it is supported on the bottom wall member 108 and the wall member 26 via the suction pipe member 118 (the suction pipe portion 114 and the connecting pipe portion 117) and the ejection pipe 50.

The filtering device 414 thus constructed may have the substantially same functions and effects as the filtering device 14 of the first embodiment. Further, in this embodiment, the fuel pump 16 is disposed in the fuel reservoir portion 15 while it is positioned adjacent to the filter member 24'. Therefore, the fuel pump 16 can be horizontally compactly arranged in the filtering device 414. This structure is suitable for the flat-type fuel tank 12.

Further, the filter member 24' has the fuel reservoir recess 112 that is defined by the inner circumferential surface of the upper filter element 28' and the upper surface of the bottom wall member 108. Therefore, the fuel can be reserved in the fuel reservoir recess 112. In addition, the fuel reserved in the fuel reservoir recess 112 can be filtered by the filter member 24' and then be drawn into the fuel pump 16. Therefore, even when the fuel contained in the fuel tank 12 is reduced, the fuel can be drawn by the fuel pump 16, so as to be continuously fed to the engine. Thus, the discontinuous combustion of the engine can be further effectively avoided. This means that the engine can be stably operated for an extended period of time.

Further, the end portions of the suction pipe portion 114 that is communicated with the fuel inlet port 17 of the fuel pump 16 are inserted into the pipe connecting ports 115 that are oppositely formed in the central portions of the front and rear inner side surfaces of the filter member 24'. In other words, inlet portions of the suction pipe member 118 that is communicated with the fuel inlet port 17 of the fuel pump 16 are respectively communicated with the interior space of the filter member 24' at the central portion of the filter member 24'. Therefore, even when the fuel contained in the fuel tank 12 is reduced, the fuel can be effectively drawn by the fuel pump 16, so that the discontinuous combustion of the engine can be further effectively avoided.

Further, in this embodiment, the width and the length of the filter member 24' are increased, so that the filter member 24' can have sufficient filtration area. Therefore, the filter member 24' can continuously contact the fuel even when the fuel in the fuel tank 12 is extremely reduced. As a result, the fuel can be effectively drawn by the fuel pump 16.

Sixth Embodiment

The sixth detailed representative embodiment will now described with reference to FIGS. 26 to 28.

Because the sixth embodiment relates to the fifth embodiment, only the constructions and elements that are different from the fifth embodiment will be explained in detail. Elements that are the same in the fifth and sixth embodiments will be identified by the same reference numerals and a detailed description of such elements may be omitted.

Figure 26:
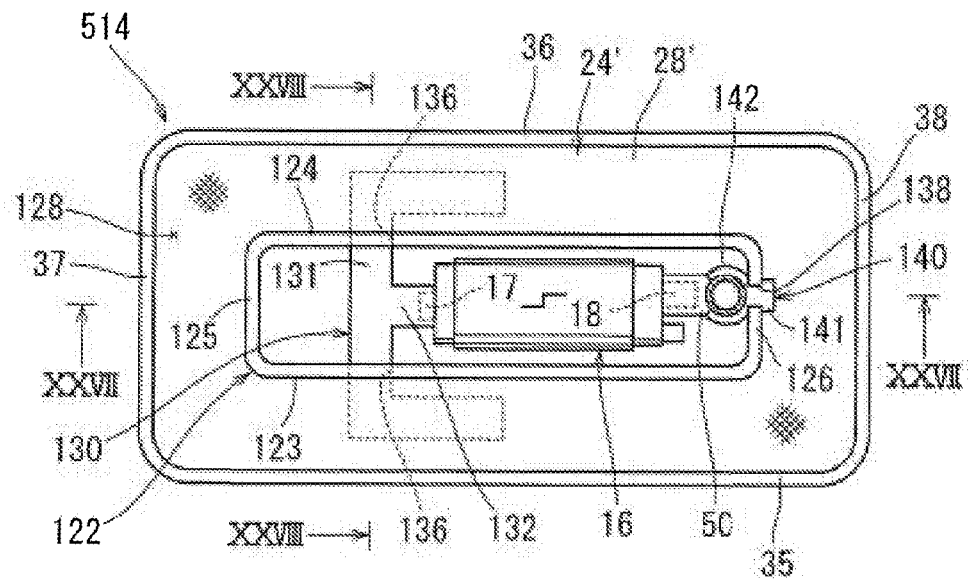
FIG. 26 is a plan view of a filtering device according to a sixth embodiment of the present invention.
Figure 27:
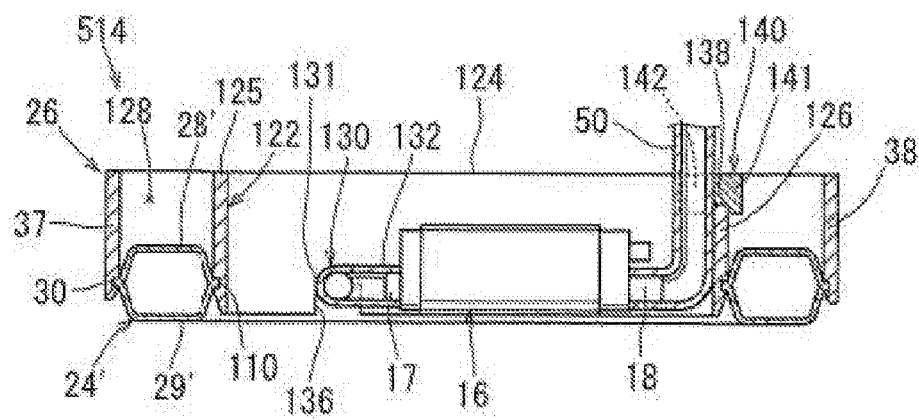
FIG. 27 is a sectional view taken along line XXVII-XXVII of FIG. 26.
Figure 28:
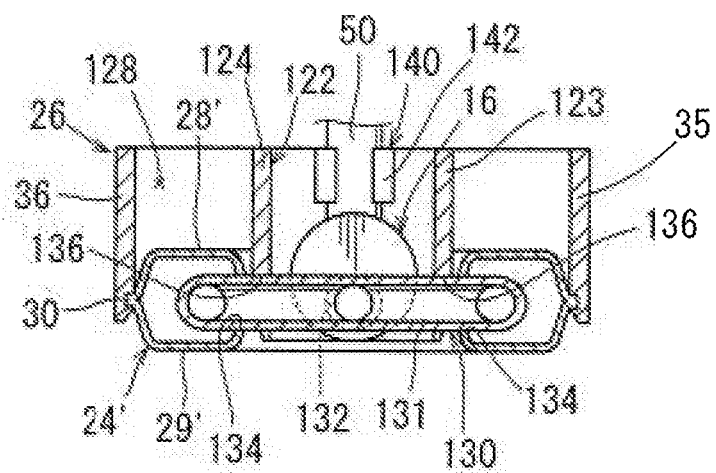
FIG. 28 is a sectional view taken along line XXVIII-XXVIII of FIG. 26.

As shown in FIGS. 26 and 27, in a filtering device 514 of this embodiment, the bottom wall member 108 of the fifth embodiment is omitted. Instead, in this embodiment, a bottomless vertical inner wall member 122 is disposed in the central opening of the filter member 24'. The inner wall member 122 has a rectangular (annular) shape and is shaped to extend along the annular inner side surface of the filter member 24'. In particular, as shown in FIG. 26, the inner wall member 122 includes a pair of elongated wall portions (a front wall portion 123 and a rear wall portion 124) and a pair of shortened wall portions (a left wall portion 125 and a right wall portion 126). Further, the wall member 26 may be referred to as an outer wall member to the inner wall member 122.

The filter member 24' is attached to the inner wall member 122 using the same attaching structure of the filter member 24 to the wall member 26. That is, the annular welding portion 110 of the filter member 24' is introduced into an attachment recess formed in an outer circumferential surface of the inner wall member 122, so the filter member 24' can be attached to the inner wall member 122. As a result, an annular fuel reservoir portion 128 is formed above the filter member 24' instead of the fuel reservoir portion 15 of the fifth embodiment. In particular, the annular fuel reservoir portion 128 is defined by the filter member 24', the wall member 26 and the inner wall member 122.

The fuel pump 16 is horizontally disposed inside the inner wall member 122. As shown in FIG. 27, the fuel pump 16 is positioned on a lower portion of the inner wall member 122 such that the fuel inlet port 17 and the fuel outlet port 18 are respectively directed leftwardly and rightwardly.

As best shown in FIG. 26, a T-shaped suction pipe member 130 is disposed in the inner wall member 122. The suction pipe member 130 functions to communicate between the fuel outlet port 18 of the fuel pump 16 and the interior space of the filter member 24'. The suction pipe member 130 may preferably be made of resin. The suction pipe member 130 has a suction pipe portion 131 and a connecting pipe portion 132. The suction pipe portion 131 extends backward and forward (upward and downward in FIG. 26). As best shown in FIG. 28, both end portions (upstream end portions) of the suction pipe portion 131 are respectively inserted into pipe connecting ports 134 that are formed in the filter member 24', so as to be communicated with the interior space of the filter member 24'. The pipe connecting ports 134 are oppositely formed in the front and rear inner side surfaces (the front and rear portions of the annular inner side surface) of the filter member 24'. As shown in FIG. 26, each of the end portions of the suction pipe portion 131 introduced into the filter member 24' is bent rightwardly and is opened at the central portion of the filter member 24'. Thus, the end portions of the suction pipe portion 131 are communicated with the interior space of the filter member 24' at the central portion of the filter member 24'. Further, as best shown in FIG. 27, the inner wall member 122 (the front and rear wall portions 123 and 124) has inverted U-shaped notches 136 that are formed therein. The notches 136 are respectively aligned with the pipe connecting ports 134, so as to receive the suction pipe portion 131 therein. Further, in this embodiment, each of the end portions of the suction pipe portion 131 may be referred to as an inlet portion of the suction pipe member 130.

As best shown in FIG. 26, the connecting pipe portion 132 is integrally formed in a central portion of the suction pipe portion 131 so as to project rightwardly therefrom. A distal end portion of the connecting pipe portion 132 is connected to the fuel inlet port 17 of the fuel pump 16.

As shown in FIG. 27, the ejection pipe 50 is positioned inside the inner wall member 122 so as to vertically extend along the right wall portion 126 of the inner wall member 122. The ejection pipe 50 thus positioned is secured to the right wall portion 126 via a grommet 140. The grommet 140 integrally includes an engaging portion 141 that is capable of being received in a U-shaped support groove 138 formed in the right wall portion 126 and a C-shaped pipe holding portion 142 that is capable of elastically clamping the ejection pipe 50. The upstream end portion of the ejection pipe 50 is connected to the fuel outlet port 18 of the fuel pump 16. Thus, the fuel pump 16 can be secured within the inner wall member 122 via the suction pipe member 130 and the ejection pipe 50.

The filtering device 514 thus constructed may have the substantially same functions and effects as the filtering device 414 of the fifth embodiment. Further, in this embodiment, the fuel pump 16 is positioned outside the fuel reservoir portion 128. Therefore, a relatively large amount of fuel can be reserved in the fuel reservoir portion 128.

Further, as shown in FIG. 26, the fuel pump 16 is disposed inside the filter member 24' and is positioned adjacent thereto. Therefore, the fuel pump 16 can be horizontally compactly arranged in the filtering device 514. This structure is suitable for the flat-type fuel tank 12.

The fuel pump 16 can be appropriately lowered in the filtering device 514. That is, the fuel pump 16 can be disposed in the substantially same level as the filter member 24'. Therefore, the fuel inlet port 17 of the fuel pump 16 can be positioned on the substantially same level as the upstream end portion of the suction pipe portion 131 (the inlet portion of the suction pipe member 130) introduced into the interior space of the filter member 24'. In other words, a level difference between the fuel inlet port 17 of the fuel pump 16 and a fuel suction position of the suction pipe portion 131 can be minimized. As a result, a fuel suction force of the fuel pump 16 can be effectively prevented from being reduced.

Seventh Embodiment

The seventh detailed representative embodiment will now described with reference to FIGS. 29 to 31.

Because the seventh embodiment relates to the sixth embodiment, only the constructions and elements that are different from the sixth embodiment will be explained in detail. Elements that are the same in the sixth and seventh embodiments will be identified by the same reference numerals and a detailed description of such elements may be omitted.

Figure 30:
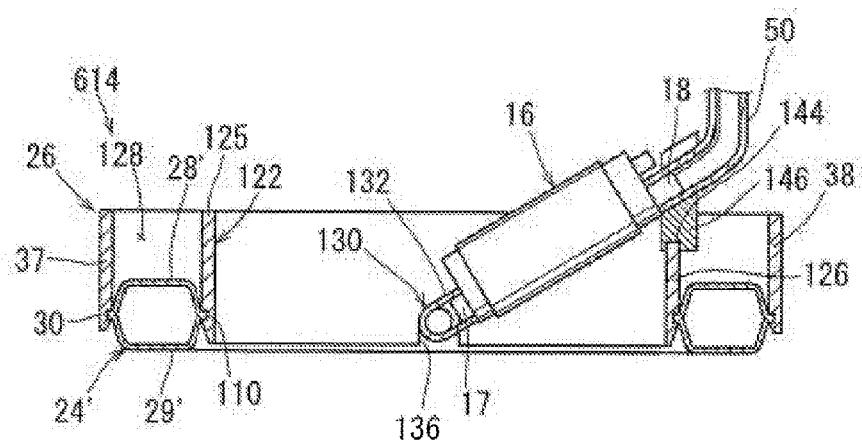
FIG. 30 is a sectional view taken along line XXX-XXX of FIG. 29.
Figure 31:
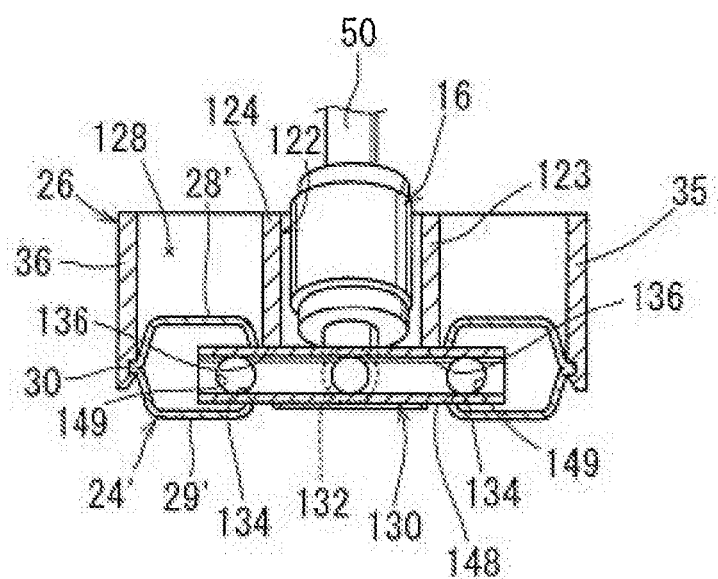
FIG. 31 is a sectional view taken along line XXXI-XXXI of FIG. 29.
Figure 32:
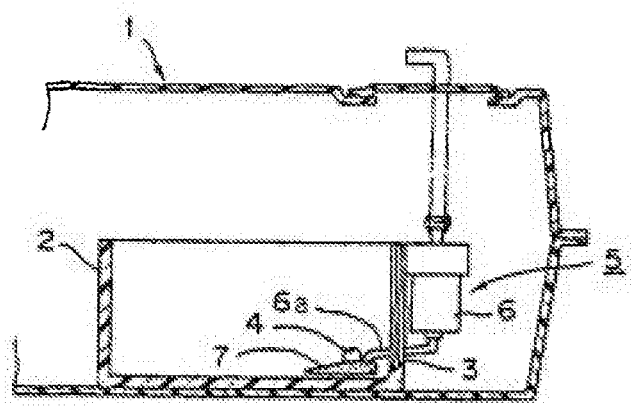
FIG. 32 is a sectional view of a fuel tank in which a conventional filtering device is disposed.

As shown in FIG. 30, in a filtering device 614 of this embodiment, the fuel pump 16 is obliquely disposed in the inner wall member 122 while a right side thereof is lifted up such that the fuel outlet port 18 is obliquely directed upwardly.

Figure 29:
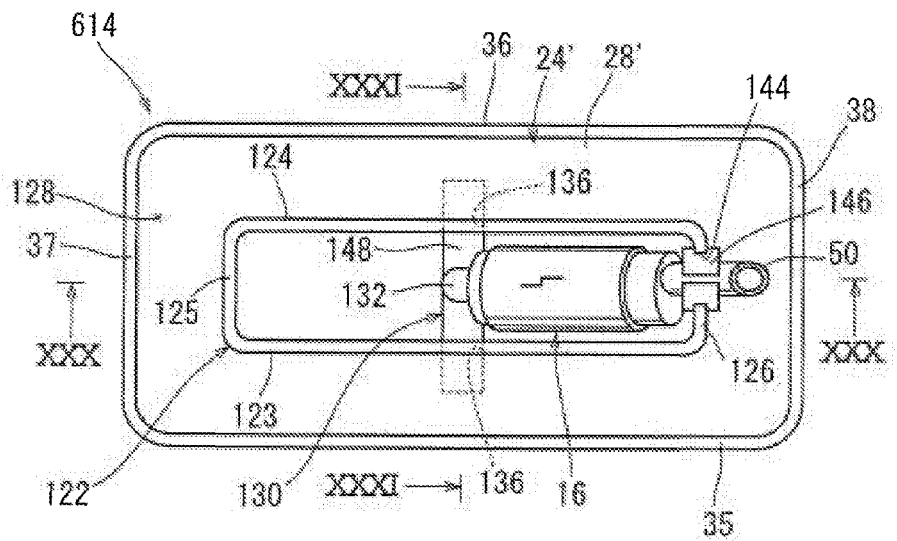
FIG. 29 is a plan view of a filtering device according to a seventh embodiment of the present invention.

As best shown in FIG. 29, the suction pipe member 130 has a straight suction pipe portion 148 that is different from the suction pipe portion 131 of the sixth embodiment. The suction pipe portion 148 is positioned on a laterally central portion of the inner wall member 122 so as to extend backward and forward (upward and downward in FIG. 29). As best shown in FIG. 31, similar to the sixth embodiment, both end portions of the suction pipe portion 148 are respectively inserted into the pipe connecting ports 134 that are formed in the filter member 24', so as to be communicated with the interior space of the filter member 24'. As shown in FIG. 29, each of the end portions of the suction pipe portion 148 introduced into the filter member 24' is opened at the central portion of the filter member 24'. Further, as shown in FIG. 31, each of the end portions of the suction pipe portion 148 has a pair of fuel suction openings 149 that are opened into the interior space of the filter member 24'. The fuel suction openings 149 may preferably be laterally oppositely formed.

As shown in FIGS. 29 and 30, the ejection pipe 50 is positioned above the inner wall member 122 so as to obliquely cross the right wall portion 126 of the inner wall member 122. The ejection pipe 50 thus positioned is obliquely secured to the right wall portion 126 via a grommet 146 that is received in a U-shaped support groove 144 formed in the right wall portion 126. As will be recognized, the grommet 146 has the substantially same structure as the grommets 48, 48', 48" and 48'" except that the grommet 146 is designed to obliquely support the ejection pipe 50.

The filtering device 614 thus constructed may have the substantially same functions and effects as the filtering device 514 of the sixth embodiment. Further, in this embodiment, the fuel pump 16 is obliquely positioned (FIG. 30). Therefore, similar to the sixth embodiment, the fuel pump 16 can be horizontally compactly arranged in the filtering device 614. This structure is also suitable for the flat-type fuel tank 12.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A filtering device comprising:
 a filter member comprised of two dish-shaped filter elements joined along corresponding welding portions and defining a filtrated interior volume,
 a fuel pump disposed in a fuel tank,
 piping having a first end in fluid communication with the filtered interior volume, and a second end connected to a fuel inlet port of the fuel pump in order to filtrate fuel drawn by the fuel pump; and
 a wall member comprising a lid portion, peripheral walls, and a lower opening,
 wherein the peripheral walls of the wall member directly contact the filter member along the welding portions, and seal the lower opening of the wall member to form a fuel reservoir portion above the filter member;
 wherein the lid portion has a fuel flow opening that allows the fuel in the fuel tank to flow into the fuel reservoir portion therethrough;
 wherein the fuel pump is horizontally disposed on the lid portion; and
 wherein the fuel pump is supported on the wall member by a pump receiving portion formed in an upper surface of the lid portion such that the fuel pump is positioned above the fuel reservoir portion.

2. The filtering device according to claim 1, wherein the lid portion is integrally formed in the wall member.

3. The filtering device according to claim 1, wherein the fuel pump is arranged so as to be positioned within the fuel reservoir portion in plan.

4. The filtering device according to claim 1, wherein a pressure regulator controlling a pressure of the fuel fed to an engine is disposed on the lid portion.

* * * * *